Nov. 30, 1971     C. T. NYE     3,623,308
FRUIT HARVESTER

Filed Aug. 6, 1969     6 Sheets-Sheet 1

INVENTOR.
CUYLER T. NYE.
BY
ATTORNEY

Nov. 30, 1971  C. T. NYE  3,623,308
FRUIT HARVESTER
Filed Aug. 6, 1969  6 Sheets-Sheet 2

INVENTOR.
CUYLER T. NYE.
BY
ATTORNEY

INVENTOR.
CUYLER T. NYE.
BY
ATTORNEY

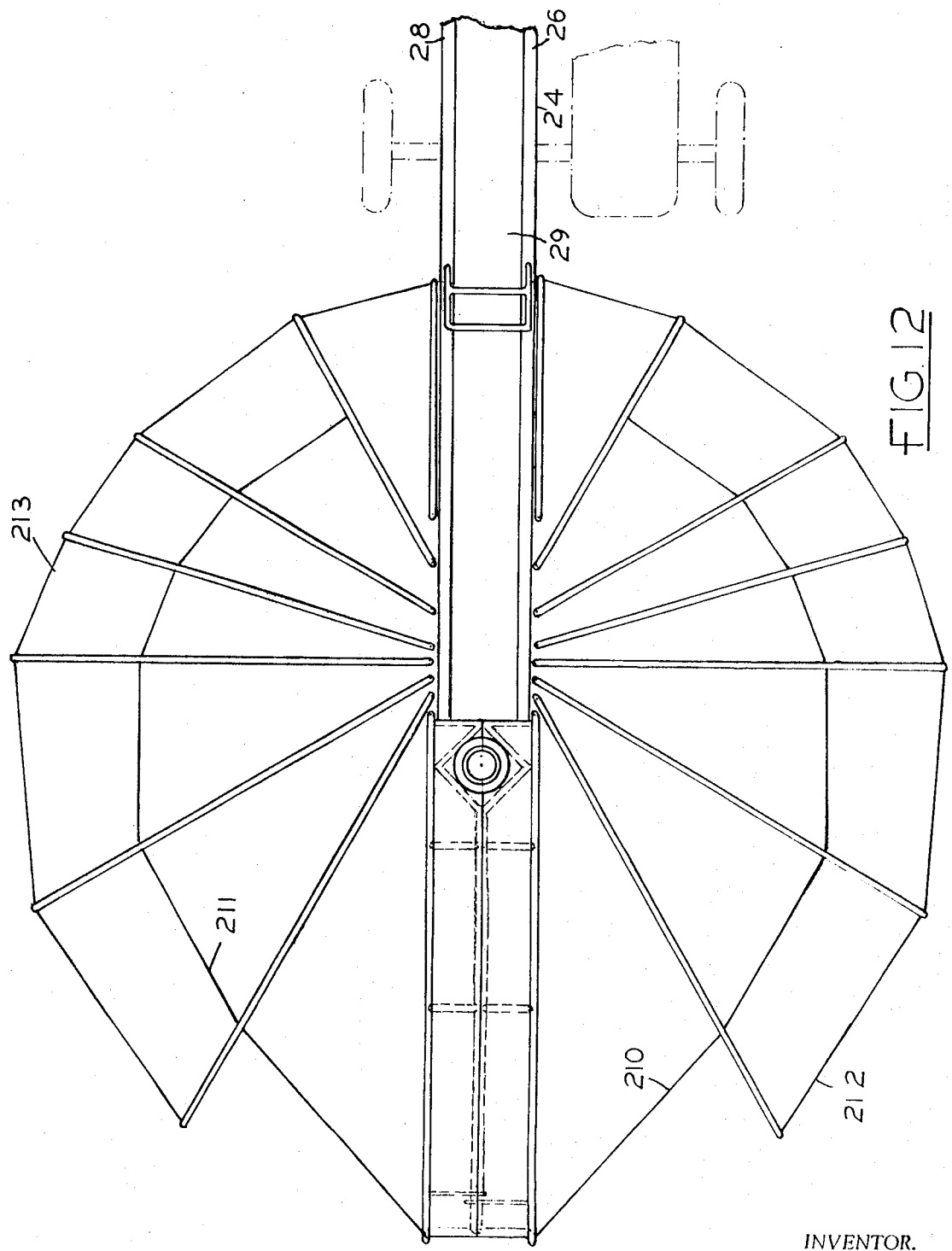

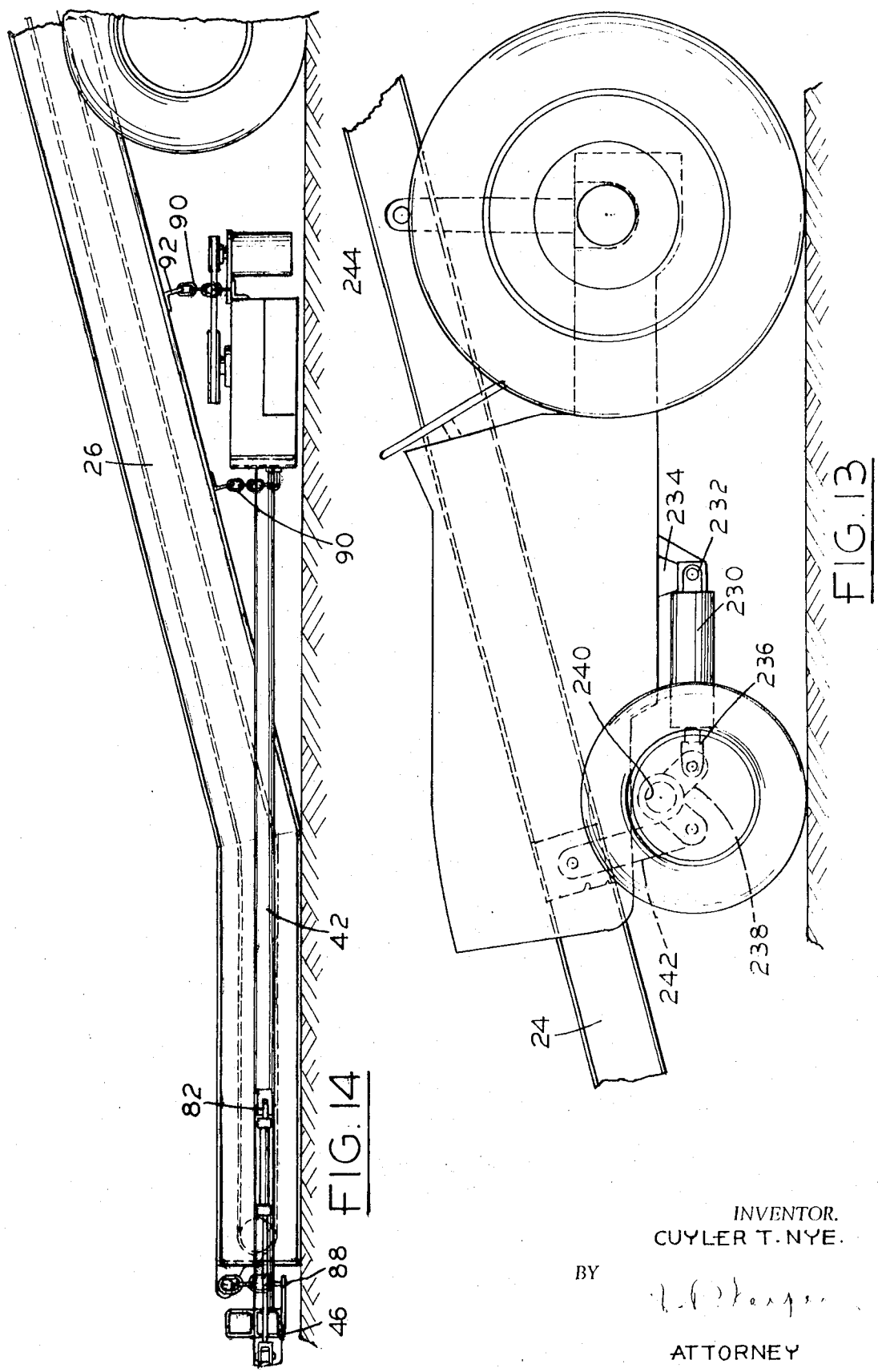

United States Patent Office 3,623,308
Patented Nov. 30, 1971

3,623,308
FRUIT HARVESTER
Cuyler T. Nye, R.D. 3, Lyons, N.Y. 14489
Filed Aug. 6, 1969, Ser. No. 847,901
Int. Cl. A01g *19/08*
U.S. Cl. 56—328 TS
9 Claims

ABSTRACT OF THE DISCLOSURE

Harvester having an inclined conveyor with an end adapted to lie close to the ground and adapted to be disposed radially with respect to a tree trunk, and having flexible apron bearing arms pivoted on vertical axes on opposite sides of the lower end of the conveyor and adapted to swing from a retracted position extending along the conveyor sides, to fanned out positions around a tree trunk, and having a semi-circular flexible harvest catching apron secured to the arms on each side of the conveyor, power means to open and close the apron, and vibratory inertia tree trunk shaker means disposed beneath the conveyor, with tree trunk clamp means connected by columns extending along the opposite side of said conveyor.

---

This invention relates to fruit harvesting and more particularly to a harvester adapted to catching falling fruit dislodged by shaking or other means.

In Pat. No. 3,392,517, granted July 16, 1968, and a copending application Ser. No. 712,417, filed Mar. 12, 1968, there is disclosed fruit harvesters employing inertia type tree shaking apparatus and in the latter application the shaker is combined with folding fruit catching apparatus in conjunction with conveyor means mounted upon a tractor, all for ready movement from tree to tree for rapid harvest.

The present invention is an improvement over the disclosures above referred to and comprises a tractor carried conveyor adapted to have its end moved into position adjacent the trunk of a tree from which the fruit is to be harvested, the conveyor frame acting as a boom and a support for a symmetrical folding fruit catching apron which may be quickly opened when under a tree and quickly closed for movement of the apparatus from tree to tree. Associated with the catcher is an inertial tree trunk shaker having a remote controlled clamp or jaw for making a secure and rigid connection to the tree trunk for applying vibratory forces thereto over a wide range of frequencies.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIG. 12 is a plan view of a modified catcher frame in open position;

FIG. 13 is a schematic view of a form of conveyor lifting apparatus mounted on the supporting tractor; and FIG. 14 is a side view of the shaker apparatus showing its mounting upon the conveyor frame.

Figure 1:
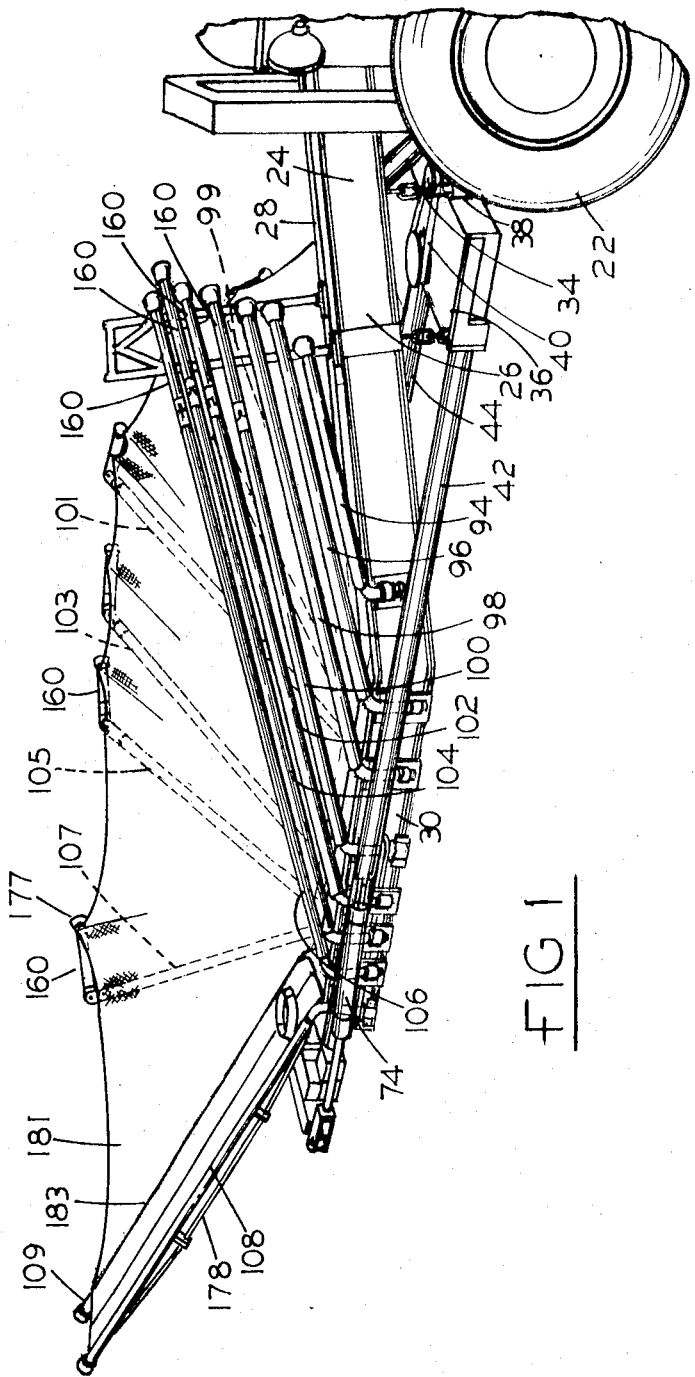
FIG. 1 is a perspective view of the apparatus with one-half of the catcher open and the other half with the apron removed, and all support arms in retracted position except the most forward arm.

Referring to FIG. 1 there is shown a tractor 20 and its front left wheel 22, on which tractor is mounted a forwardly and downwardly extending conveyor 24, having spaced side channel members 26 and 28 between which a conveyor belt 29 is disposed. The channel members 26 and 28 extend upwardly along one side of the tractor engine and inside of the tractor right wheel and its upper end is adapted to discharge into open crates supported upon a tractor carried platform at the rear, one form of which is disclosed in the pending application referred to above.

The channel members 26 and 28 extend forwardly and downwardly into end portions 30 and 32 which are at an angle to the inclined portion and adapted to lie substantially horizontal upon the ground, while reaching substantially to the trunk of a tree. Hydraulic means 34 acting between the tractor frame and the under side of the conveyor 24 is adapted to lift the forward end of the conveyor channels 30 and 32 from the ground so that the tractor may quickly move the apparatus from tree to tree.

Figure 2:
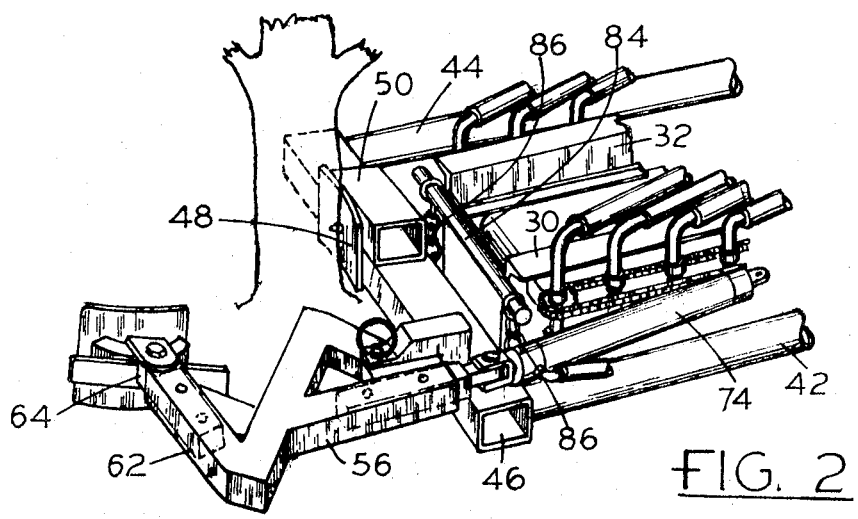
FIG. 2 is a perspective view of the tree trunk grip in in open position.
Figure 3:
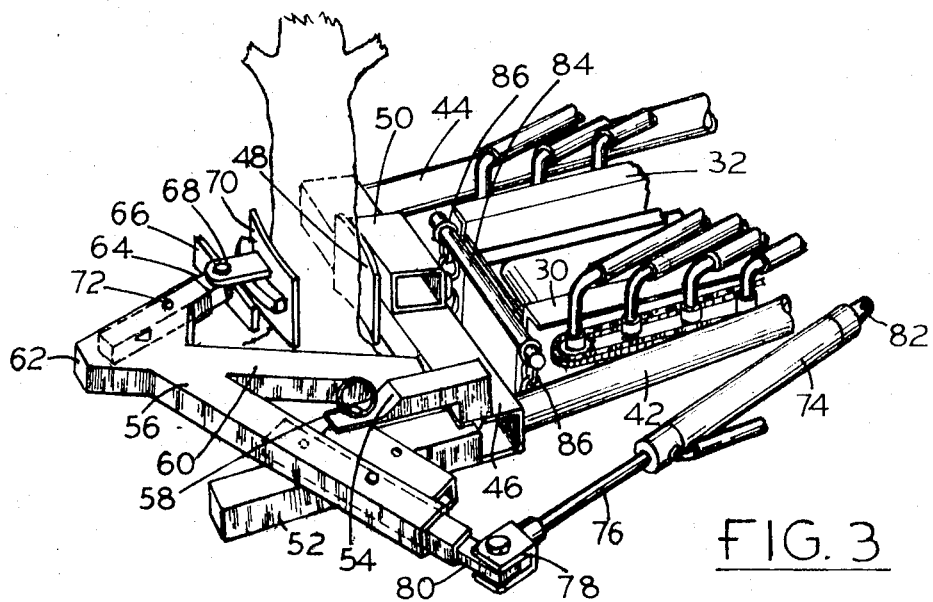
FIG. 3 is a perspective view of the grip in closed position.

In FIGS. 1 through 3 there is shown a shaker housing 36 in which are disposed a pair of eccentric weights which are driven by a hydraulic motor 38 and a belt drive 40 through a wide range of speeds to provide rapidly reversing fore and aft inertia forces. The shaker housing 36 is rigidly connected to tubular struts 42 and 44 extending along the opposite sides of the lower end of the conveyor 24 to a forward transverse member 46 having centrally disposed thereon an arcuate tree trunk grip plate 48. The grip plate is backed up by a rigidifying member 50 in the center area above the transverse member 46. A gripping apparatus comprising spaced forward projecting arms 52 and 54 rigidly affixed to one end of the transverse member 46 supports a lever-like gripping arm 56 fulcrumed on a heavy pivot 58. The arm is braced by a figure "4" configuration 60 and the end of the lever arm is provided with a transverse tubular guide-way 62 in which is positioned the shank 64 of a T-like member 66, to which is pivotally attached as at 68, a tree grip member 70. The shank 64 may be adjusted as to position in the guide-way 62 and is securely locked in position by a removable pin 72. It will be seen that the grip plate 70 is of somewhat arcuate configuration and is free to rock slightly within limits as determined by the transverse member 72 and the T member 66. The grip lever arm 56 is actuated by a hydraulic cylinder 74 having a piston 76 connected through a clevis 78 to a projection 80 on the lever 56, the other end of the cylinder 76 being swivelly connected as at 82 to the side of the strut 42 (see FIG. 14).

Each of the grip plates are preferably faced with a layer or relatively solid padding material such as canvas belting which may be vulcanized, and about 3/16 inch thick. Loosely overlying the padding is a thin layer of inner tube rubber for contact with the tree trunk, such rubber protecting the tree trunk from any shift of the clamping members during the clamping up operation, the rubber sliding over the padding. It will be understood that the more solid the connection between the shaker and tree trunk, the easier it is to achieve a resonant condition during shaking.

The forward end of the shaker mechanism is suspended from a transverse bar 84 affixed to the forward ends of the channel members 30 and 32 of the conveyor side channel members. Short chains 86 extend downwardly from either end of the bar 84 to plates 88 projecting rearwardly from the under side of the catcher member 46. The housing of the inertia apparatus is also supported by short chains 90 two of which depend from brackets on the under side of the conveyor channel members 26 and 28 and the other of which is centered with respect to the conveyor and suspends from the center of a transverse angle iron 92 (see FIG. 14).

A catcher apparatus comprises a plurality of arms such as 94, 96, 98, 100, 102, 104, 106 and 108, which arms extend in an inclined manner from their substantially vertically extending pivoted ends, indicated as at 110. Each end is pivoted in spaced upper and lower bearings 112 and 114 extending outwardly from plates 116 extending between the upper and lower flanges 118 and 120 of the conveyor channel member 24. Each of the arms with the exception of 108 is preferably provided with coil springs indicated at 122 and 124 to urge the arms to swing to the retracted position as is indicated by the arms 94, 96, 98, 100, 102, 104 and 106 in FIG. 1.

The forward arm 108 and its counterpart 109 on the other side of the conveyor are each actuated by hydraulic cylinders such as 130 mounted on the outside of the webs 132 and 133 of the channel members 30 and 32. The vertical portion 134 of the arm 108 or 135 of the arm 109 are journalled in bearings such as 136 and 138 rigidly affixed to the flanges of their respective conveyor channel members. Centrally disposed and affixed to the shafts 134, or 135, are sprockets 142 over which run a sprocket chain 144 extending rearwardly to an idler shaft 146 having a sprocket 148 thereon. The shaft 146 is journalled as at 148 and 150 in bearings affixed to the upper and lower flanges of the conveyor channels. A piston 150 actuated by the cylinder 130 is affixed to the central portion of the inside reach 152 of the chain 144 as at 154. It will be seen from the foregoing that actuation of the piston of either cylinder 130 in a forward direction will swing the arm 108 and the arm 109 from a forward position to a rearward closed position, whereas power applied to the cylinder to move the piston rearwardly will move the arm 108 and the arm 109 to the position indicated in FIG. 1.

Figures 8A, 8B:
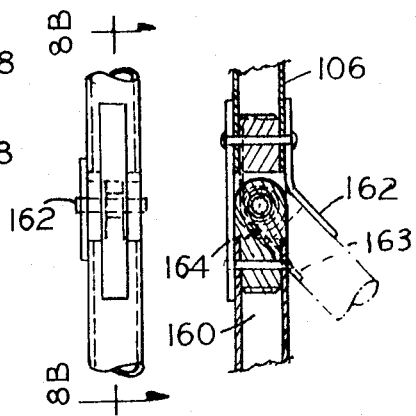
FIG. 8A is a fragmentary view of a pivoted elbow employed in the catcher arms.
FIG. 8B is a sectional view taken on the line 8B—8B of FIG. 8A.
Figure 10:
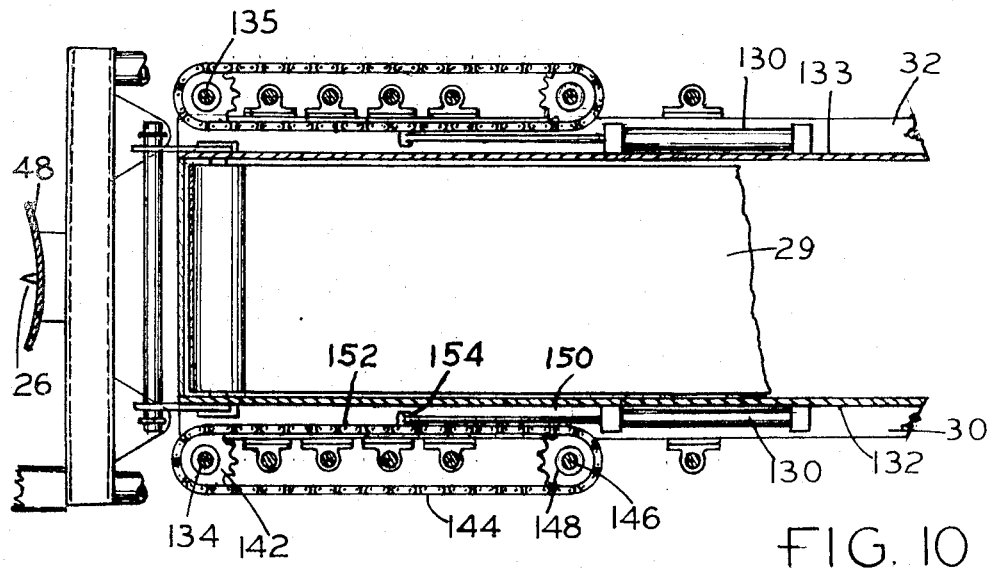
FIG. 10 is a sectional view taken substantially on the line 10—10 of FIG. 9.
Figure 9:
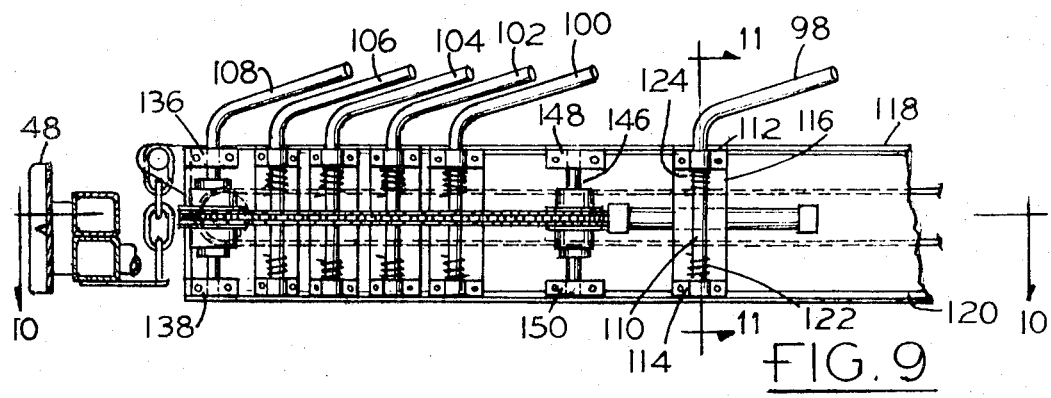
FIG. 9 is a side view of the conveyor frame showing the mounting of catcher support arms thereon.
Figure 11:
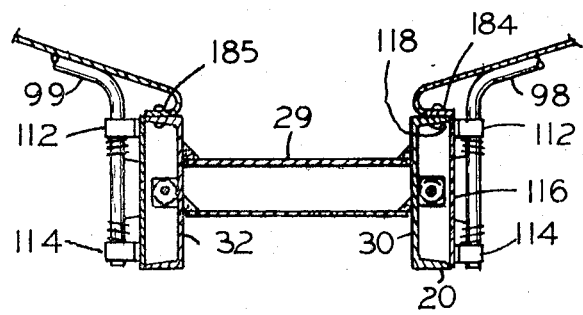
FIG. 11 is a transverse sectional view taken substantially on the line 11—11 of FIG. 9.

Each of the catcher arms, other than 108 and 109, are provided with short elbow-like pivoted end portions 160 which are adapted to bend by reason of a pivotal elbow-like joint 162, shown in more detail in FIGS. 8A and B, the arm 106 with its pivotal extension 160 being shown therein. The arm 106 may be provided with an angle stop 162 on one side and a plate stop 164 on the other to limit the angular movement between the extension 160 and arm 106, and preferably, a coil spring 163 will be employed around the pivot to urge the arm extension 160 to a position in alignment with the remainder of the arm 106.

The forward arm 108 is provided with a laterally extending framework 170, the latter of which has an offset 172 to accommodate the trunk T of a tree. The arm 108 and its frame 170 is provided with a covering indicated at 174 and a flexible yielding semi-circular tree trunk engaging collar portion 176 which is affixed to the offset portion 172 of the framing 170. The arm 109 is similarly provided with framing 171 and a tree trunk receiving offset 173 and a semi-circular tree trunk engaging collar portion 177. The underside of the framing 170 and 171 may be stiffened as by bracing shown at 178 and 179 disposed beneath the arms 108 and 109.

A substantially semi-circular section of light flexible fabric such as 181 has the forward half of its diametral edge 183 affixed to the rod 109 and it rearward edge to the upper flange of the conveyor channel 32 as at 185 as indicated, and its circular edge attached to the extremities 177 of the extensions 160 of the various support arms 107, 105, 103, etc., on the right hand side of the catcher. It will be understood that the pivotal extensions 160 may be employed on the longer arms or all of them, or omitted on some of the shorter arms, it being the object of the extensions to provide sufficient yield so as not to unduly strain the apron material.

Figure 4:
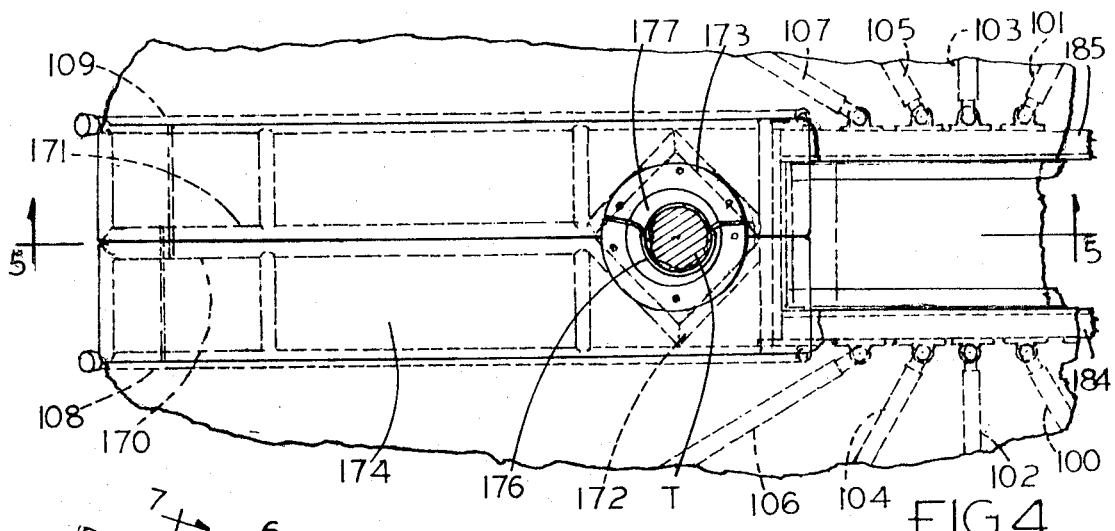
FIG. 4 is a fragmentary plan view of the catcher in open position.
Figure 5:
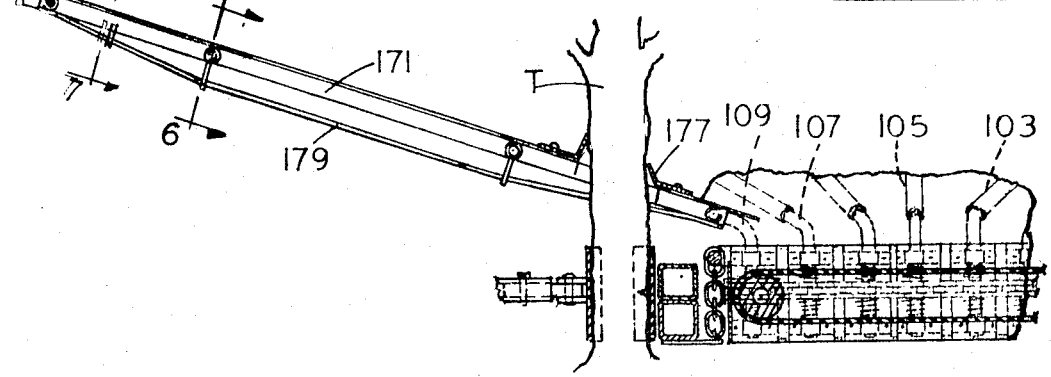
FIG. 5 is a sectional view taken substantially on the line 5—5 of FIG. 4.
Figure 6:
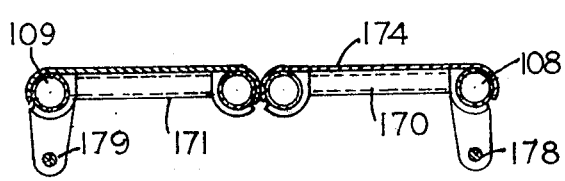
FIG. 6 is a sectional view taken substantially on the line 6—6 of FIG. 5.
Figure 7:
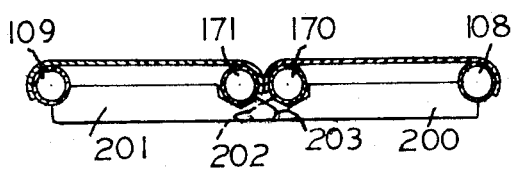
FIG. 7 is a sectional view taken substantially on the line 7—7 of FIG. 5.

In FIG. 7 in connection with the arms 108 and 109 and the framing 170 and 171, there is shown transverse members 200 and 201 each of which has an inclined tongue 202 and 203 respectively adapted when the arms 108 and 109 are swung toward the closed position as shown in FIG. 4 or FIG. 1, to aline the framing 170 and 171 so as to lie substantially in a common plane. The arms 108 and 109 may be held in the position shown in FIG. 1 or FIG. 4 by maintaining pressure on the hydraulic cylinders 130 which acted to cause the arms to swing into the position shown.

In FIG. 12 there is shown schematically a variation in the catcher frame where a few number of arms (the number may be varied) are employed and wherein the relative angular position between arms when in the open position is determined by flexible cabling such as 210 and 211, such cabling being designed to prevent the fabric forming the apron from being unduly strained. A similar flexible cable may also connect the outer ends of the arms as at 212 and 213 to further resist undue tensioning of the apron material. When such cabling is employed it may be optional as to whether the pivotal extensions 160 will be used.

In FIG. 13 there is shown an alternative construction for elevating the forward end of the conveyor from the ground for movement from one tree to the next. As shown, there is provided a hydraulic cylinder 230 pivoted at its rear as at 232 upon a bracket 234 depending from one of the frame members of the tractor. The forward end of the cylinder is provided with a piston 236 acting through a bell crank 238 fulcrumed on an axle 240 of the tractor, the bell crank acting through a link 242 to lift the forward end of the conveyor, the rear end being pivotally supported as at 244.

From the foregoing, it will be seen that the operator of the tractor, will approach a tree, lower the conveyor to or near ground level, and move up to engage the plate 48 with the tree trunk. The plate may have a small spike 260 to prevent any shifting. Thereupon the cylinder 74 is activated to apply the clamp member 70 to rigidly grip the tree, the hydraulic fluid being retained in the cylinder.

Thereupon, cylinders 130 are activated to swing arms 108 and 109 around the trunk and together on the far side, opening the apron on both sides. Thereupon hydraulic fluid is applied to motor 38 and inertia fore and aft inertia forces over a wide frequency range are created, shaking the tree trunk, and passing through resonant frequencies. In about 5 to 10 seconds time the fruit, which may be cherries for example, is separated from the stems or their twigs and drops to the apron, whence it rolls onto the conveyor, the belt movement of which was started when the shaking commenced. After discontinuing the shaking, the conveyor continues to operate until the fruit is carried to the crates located beneath the upper discharge end of the conveyor. At this point, the apron is returned so as to extend rearwardly along the opposite sides of the conveyor, the conveyor is lifted and the apparatus proceeds to the next tree.

While one embodiment of the invention with variations has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A harvester comprising a conveyor having spaced side members, a relatively horizontal end portion adapted to lie close to the ground and an inclined portion, said conveyor adapted to be disposed radially with respect to the trunk of a tree, with its lower end adjacent a tree trunk, a plurality of flexible apron bearing arms each having outwardly and upwardly inclined portions and inner vertical end portions, each inner vertical end portion pivotable in a respective bracket on a vertical axis on opposite side members of the lower horizontal end of the conveyor and said bearing arms adapted to swing from a retracted position extending upwardly along the conveyor side members, to fanned out positions around a tree trunk, a substantially semi-circular flexible harvest catching apron secured to the arms on each side of the conveyor, and each apron having a radial edge overlying and secured to their respective side members of the conveyor whereby upon fanning out the arms on the opposite sides of the conveyor, a substantially circular catching apron inclined toward the conveyor is provided.

2. A harvester according to claim 1 wherein the aprons have recesses to embrace a tree trunk.

3. A harvester according to claim 1, wherein clamp means are provided for the tree trunk beyond the end of the conveyor, and vibratory inertia tree trunk shaker means are disposed beneath the inclined portion of the conveyor, and said shaker means and said clamp means are rigidly connected by horizontal columns extending along and outside of the opposite side members of said conveyor, and said clamp means and said shaker means are freely suspended from the end of the conveyor and the inclined portion of the conveyor.

4. A harvester according to claim 3 wherein the clamp means, columns and shaker means are suspended from the conveyor by flexible chains.

5. A harvester according to claim 2 wherein power means are provided to positively swing each of the forward most arms on the opposite sides of the conveyor into fanned out position.

6. A harvester according to claim 5 wherein the remaining arms are yieldingly urged toward retracted position.

7. A harvester according to claim 3 wherein the clamp means includes a fixed clamp member adapted to bear against a three trunk immediately adjacent the conveyor end, and a second clamp member pivotally mounted with respect to the fixed clamp member to move from a tree trunk clamp position in opposition to the fixed clamp member, to a position to one side of the fixed clamp member whereby the fixed clamp may be moved radially into engagement with a tree trunk.

8. A harvester according to claim 7 having a hydraulic cylinder actuator for the second clamp member, to grip a tree trunk through a diameter substantially in alignment with the conveyor.

9. A harvester according to claim 8 wherein each of the clamp members have faces lined with a thin layer of vulcanized webbing, and an overlying sheet of rubber unattached to webbing face.

References Cited

UNITED STATES PATENTS

| | | | |
|---|---|---|---|
| 2,714,281 | 8/1955 | Steele | 56—329 |
| 3,105,346 | 10/1963 | Stanclift | 56—329 |
| 3,163,458 | 12/1964 | Brandt, Jr. | 56—328 TS X |
| 3,407,582 | 10/1968 | Poehlmann | 56—329 |

FOREIGN PATENTS

| | | | |
|---|---|---|---|
| 258,637 | 12/1967 | Austria | 56—329 |

LOUIS G. MANCENE, Primary Examiner

J. N. ESKOVITZ, Assistant Examiner

U.S. Cl. X.R.

56—329